(12) United States Patent
Kim et al.

(10) Patent No.: US 10,279,814 B2
(45) Date of Patent: May 7, 2019

(54) APPARATUS AND METHOD FOR DETERMINING DRIVING STATE

(71) Applicants: Hyundai Motor Company, Seoul (KR); Kia Motors Corporation, Seoul (KR)

(72) Inventors: Jin Kwon Kim, Suwon-si (KR); Seong Sook Ryu, Seoul (KR); Byoung Joon Lee, Suwon-si (KR); Sam Yong Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 29 days.

(21) Appl. No.: 15/605,272

(22) Filed: May 25, 2017

(65) Prior Publication Data

US 2018/0127002 A1 May 10, 2018

(30) Foreign Application Priority Data

Nov. 9, 2016 (KR) .................... 10-2016-0149060

(51) Int. Cl.
*G08G 1/16* (2006.01)
*B60W 30/09* (2012.01)
(Continued)

(52) U.S. Cl.
CPC ............ *B60W 40/10* (2013.01); *B60W 30/09* (2013.01); *B60W 50/14* (2013.01); *G08G 1/166* (2013.01);
(Continued)

(58) Field of Classification Search
CPC ...... B60W 40/10; B60W 30/09; B60W 50/14; B60W 2050/143; B60W 2050/146;
(Continued)

(56) References Cited

U.S. PATENT DOCUMENTS 5,337,238 A 8/1994 Gioutsos et al.
9,318,023 B2 * 4/2016 Moshchuk ............. G08G 1/167
(Continued)

FOREIGN PATENT DOCUMENTS

KR 10-0159294 B1 1/1999
KR 10-2012-0053217 A 5/2012
(Continued)

*Primary Examiner* — Atul Trivedi
(74) *Attorney, Agent, or Firm* — Morgan, Lewis & Bockius LLP

(57) ABSTRACT

An apparatus and a method for determining a driving state are provided. The apparatus includes a jerk calculator configured to determine a minimum prediction jerk generated in an interval until an ego vehicle arrives at a location of a preceding vehicle, using location, velocity, and acceleration information of the ego vehicle at a current time and location, velocity, and acceleration information of the preceding vehicle and determine a permission jerk of a driver of the ego vehicle, a determiner configured to determine whether the minimum prediction jerk is greater than the permission jerk of the driver and determine a careless driving state based on a driving operation state of the driver when the minimum prediction jerk is greater than the permission jerk of the driver, and a signal processor configured to output an alert when it is determined as the careless driving state.

20 Claims, 8 Drawing Sheets

(51) Int. Cl.
  *B60W 40/10*   (2012.01)
  *B60W 50/14*   (2012.01)

(52) U.S. Cl.
  CPC . *B60W 2050/143* (2013.01); *B60W 2050/146* (2013.01); *B60W 2520/105* (2013.01); *B60W 2550/302* (2013.01); *B60W 2550/306* (2013.01)

(58) Field of Classification Search
  CPC ..... B60W 2550/302; B60W 2550/306; B60W 2520/105; G08G 1/016; G08G 1/0166
  USPC ........................................................ 701/32.3
  See application file for complete search history.

(56) References Cited

U.S. PATENT DOCUMENTS

| | | | | |
|---|---|---|---|---|
| 9,594,376 | B2* | 3/2017 | Larsson | G08G 1/166 |
| 2010/0021011 | A1* | 1/2010 | Shida | B60R 1/00 |
| | | | | 382/104 |
| 2010/0055649 | A1* | 3/2010 | Takahashi | B60W 50/082 |
| | | | | 434/66 |
| 2010/0109881 | A1* | 5/2010 | Eskandarian | A61B 5/6887 |
| | | | | 340/575 |
| 2010/0209891 | A1* | 8/2010 | Lin | G09B 9/05 |
| | | | | 434/66 |
| 2010/0209892 | A1* | 8/2010 | Lin | G09B 9/05 |
| | | | | 434/71 |
| 2012/0123806 | A1* | 5/2012 | Schumann, Jr. | G06Q 40/08 |
| | | | | 705/4 |
| 2013/0054128 | A1* | 2/2013 | Moshchuk | G08G 1/167 |
| | | | | 701/301 |
| 2014/0067154 | A1* | 3/2014 | Yu | B60W 40/076 |
| | | | | 701/1 |
| 2014/0300739 | A1* | 10/2014 | Mimar | H04N 7/188 |
| | | | | 348/148 |
| 2014/0309883 | A1* | 10/2014 | Kikuchi | B60G 17/0162 |
| | | | | 701/40 |
| 2015/0057886 | A1* | 2/2015 | Larsson | G08G 1/166 |
| | | | | 701/41 |
| 2015/0175160 | A1 | 6/2015 | Sudou et al. | |
| 2016/0001781 | A1* | 1/2016 | Fung | B60W 40/08 |
| | | | | 701/36 |
| 2016/0163217 | A1* | 6/2016 | Harkness | G09B 5/06 |
| | | | | 434/65 |
| 2016/0229401 | A1* | 8/2016 | Nagatsuka | B60W 10/04 |
| 2016/0267725 | A1* | 9/2016 | Chundrlik, Jr. | B60W 50/0098 |
| 2016/0297303 | A1* | 10/2016 | Sawada | B60L 7/14 |
| 2017/0043770 | A1 | 2/2017 | Sudou et al. | |
| 2018/0032082 | A1* | 2/2018 | Shalev-Shwartz | |
| | | | | B60W 30/0953 |

FOREIGN PATENT DOCUMENTS

| | | |
|---|---|---|
| KR | 10-2014-0118153 A | 10/2014 |
| KR | 10-2015-0073111 A | 6/2015 |
| KR | 10-2015-0106202 A | 9/2015 |

\* cited by examiner

APPARATUS AND METHOD FOR DETERMINING DRIVING STATE

CROSS-REFERENCE TO RELATED APPLICATION

The present application is based on and claims the benefit of priority to Korean Patent Application No. 10-2016-0149060, filed on Nov. 9, 2016, in the Korean Intellectual Property Office, the entire contents of which is incorporated herein for all purposes by this reference.

BACKGROUND OF THE INVENTION

Field of the Invention

The present invention relates to apparatuses and methods for determining driving states.

Description of Related Art

A jerk may be a vector of specifying a time change rate of acceleration and may be represented as a third derivative about a displacement time. The jerk may indicate a vibration phenomenon in a forward and backward direction of a vehicle, which occurs in a sudden acceleration or transmission stage of a vehicle. Recently, the jerk is used as an index of evaluating a momentary ride comfort of a driver.

The driver performs a driving operation such that a jerk is not generated within an exemplary or permitted range upon sudden acceleration or transmission. However, the exemplary or permitted range of the jerk during driving varies for each driver.

Meanwhile, a collision control system of a vehicle determines time predicted to collide with a preceding time and may perform collision avoiding control based on the determined time. However, since conventional collision avoiding control does not consider a jerk of a driver, any driver may feel threatened greatly. Such threat may have an influence on ride comfort of the driver.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and method for determining a driving state to determine a careless driving state based on whether there is a driving operation when a minimum prediction jerk predicted in a specific interval is greater than a permission jerk of a driver, without a separate sensor which detects a state of the driver.

Another aspect of the present invention provides an apparatus and method for determining a driving state to control collision by reflecting a jerk a driver feels.

The technical problems to be solved by the present inventive concept are not limited to the aforementioned problems, and any other technical problems not mentioned herein will be clearly understood from the following description by those skilled in the art to which the present invention pertains.

According to various aspects of the present invention, an apparatus may include: a jerk calculator configured to determine a minimum prediction jerk generated in an interval until a ego vehicle arrives at a location of a preceding vehicle, using location, velocity, and acceleration information of the ego vehicle at a current time and location, velocity, and acceleration information of the preceding vehicle and determine a permission jerk of a driver of the ego vehicle, a determiner configured to determine whether the minimum prediction jerk determined in the interval is greater than the permission jerk of the driver and determine a careless driving state based on a driving operation state of the driver when the minimum prediction jerk is greater than the permission jerk of the driver, and a signal processor configured to output an alert when it is determined as the careless driving state by the determiner.

According to another aspect of the present invention, an apparatus may include: a jerk calculator configured to determine a minimum prediction jerk generated in an interval until a ego vehicle arrives at a location of a preceding vehicle, using location, velocity, and acceleration information of the ego vehicle at a current time and location, velocity, and acceleration information of the preceding vehicle and determine a permission jerk of a driver of the ego vehicle, a determiner configured to determine whether the minimum prediction jerk determined in the interval is greater than the permission jerk of the driver and determine a careless driving state based on a driving operation state of the driver when the minimum prediction jerk is greater than the permission jerk of the driver, and a signal processor configured to output an alert when it is determined as the careless driving state and transmit a message including information about the careless driving state to a collision control system in the ego vehicle.

According to another aspect of the present invention, a method may include: obtaining location, velocity, and acceleration information of a ego vehicle at a current time and location, velocity, and acceleration information of a preceding vehicle, determining a minimum prediction jerk generated in an interval until the ego vehicle arrives at a location of the preceding vehicle, using the location, velocity, and acceleration information of the ego vehicle at the current time and the location, velocity, and acceleration information of the preceding vehicle and determining a permission jerk of a driver of the ego vehicle, determining whether the minimum prediction jerk determined in the interval is greater than the permission jerk of the driver and determine a careless driving state based on a driving operation state of the driver when the minimum prediction jerk is greater than the permission jerk of the driver, and outputting an alert, when it is determined as the careless driving state.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
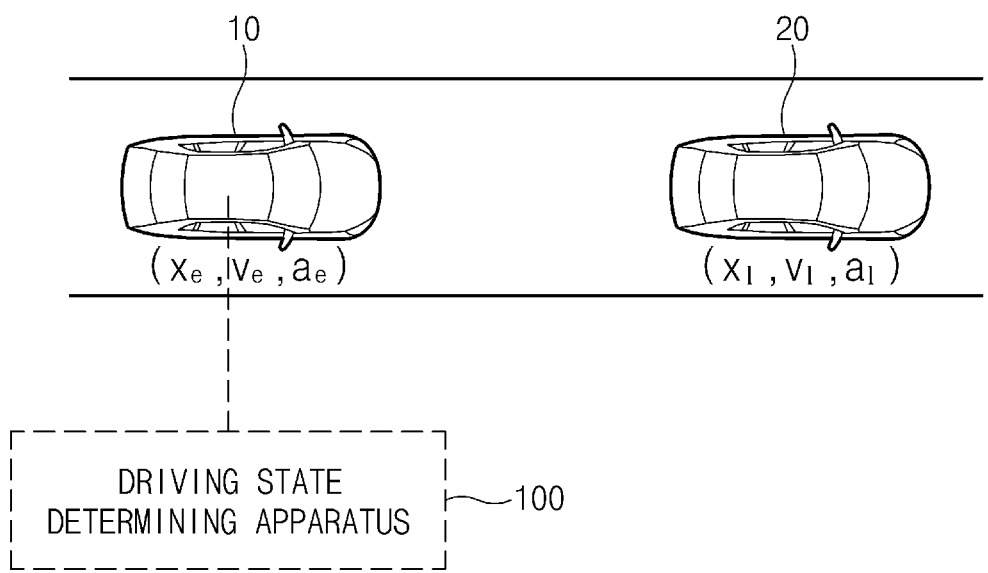
FIG. 1 is a drawing illustrating a vehicle to which a driving state determining apparatus is applied, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

In describing elements of embodiments of the present invention, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a drawing illustrating a vehicle to which a driving state determining apparatus is applied, according to an exemplary embodiment of the present invention.

Referring to FIG. 1, a driving state determining apparatus 100 according to an exemplary embodiment of the present invention may determine a minimum prediction jerk generated in an interval until a ego vehicle 10 arrives at a location of a preceding vehicle 20, using a location $x_j$, a velocity $v_j$, and an acceleration $a_j$ of the preceding vehicle 20 at a current time and a location $x_e$, a velocity $y_e$, and an acceleration $a_e$ of the ego vehicle 20 at the current time, and may verify a careless driving state based on whether the determined minimum prediction jerk is within a range of a permission jerk permitted by the driver of the ego vehicle 10, thus controlling an alert and/or collision avoiding control according to the careless driving state.

The driving state determining apparatus 100 according to an exemplary embodiment of the present invention may be implemented in a vehicle. In the instant case, the driving state determining apparatus 100 may be integrated with control units in the vehicle. Alternatively, the driving state determining apparatus 100 may be implemented to be independent of the control units in the vehicle and may be connected to the control units of the vehicle by a separate connection means. Herein, the driving state determining apparatus 100 may operate in conjunction with a drive system, a steering system, an acceleration/deceleration system, and the like of the vehicle.

Therefore, a description will be given in detail of detailed components of the driving state determining apparatus 100 with reference to FIG. 2.

Figure 2:
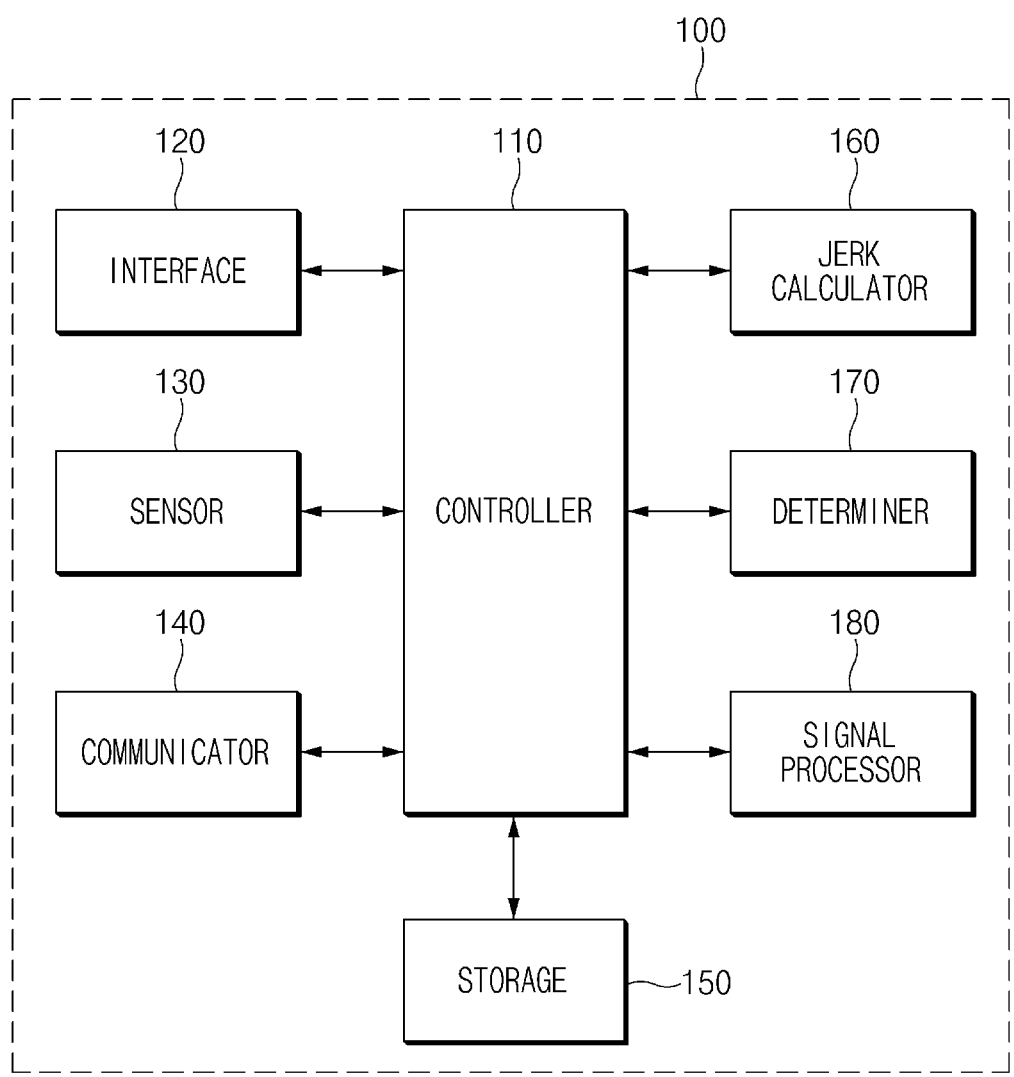
FIG. 2 is a block diagram illustrating a configuration of a driving state determining apparatus according to an exemplary embodiment of the present invention.

FIG. 2 is a block diagram illustrating a configuration of a driving state determining apparatus according to an exemplary embodiment of the present invention. Referring to FIG. 2, a driving state determining apparatus 100 may include a controller 110, an interface 120, a sensor 130, a communicator 140, a storage 150, a jerk calculator 160, a determiner 170, and a signal processor 180. Herein, the controller 110 may process a signal transmitted between the components of the driving state determining apparatus 100.

First of all, the interface 120 may include an input means for receiving a control instruction from a user and an output means for outputting an operation state, an operation result, and the like of the driving state determining apparatus 100.

Herein, the input means may include a key button and may further include a mouse, a joystick, a jog shuttle, a stylus pen, and the like. Also, the input means may include a soft key implemented on a display of the driving state determining apparatus 100.

The output means may include the display and may further include a voice output means including a speaker. In the instant case, when a touch sensor including a touch film, a touch sheet, or a touch pad is disposed in the display, the display may operate as a touch screen and may be implemented in a form of integrating the input means with the output means.

In the instant case, the display may include at least one of a liquid crystal display (LCD), a thin film transistor-LCD (TFT-LCD), an organic light-emitting diode (OLED), a flexible display, a field emission display (FED), and a three-dimensional (3D) display.

In addition, the output means may further include a speaker for outputting a warning sound, a light emitting diode (LED), and/or a buzzer.

The sensor 130 may include one or more sensors which detect an obstacle located around a vehicle, for example, a preceding vehicle 20 of FIG. 1, located in front of the vehicle and measure a distance between the vehicle and the obstacle. For example, the sensor 130 may include an ultrasonic sensor, a scanner, a camera, and the like. Of course, in addition, the sensor 130 may include any sensor which detects an obstacle and measures a distance.

Meanwhile, the sensor 130 may further include a sensor which measures a velocity and/or acceleration of the vehicle.

The communicator 130 may include a communication module for supporting a communication interface with electronics and/or control units mounted on the vehicle. For example, the communication module may include a module for supporting vehicle network communication including a controller area network (CAN), local interconnect network (LIN) communication, and flex-ray communication.

Further, the communicator 130 may include a module for wireless Internet access or a communication module for short range communication. Herein, wireless Internet technologies may include a wireless local area network (WLAN), wireless broadband (Wibro), wireless-fidelity (Wi-Fi), world interoperability for microwave access (Wimax), and the like. Short range communication technologies may include Bluetooth, ZigBee, ultra wideband (UWB), radio frequency identification (RFID), infrared data association (IrDA), and the like.

Thus, the communicator 140 may perform vehicle-to-vehicle (V2V) communication with another vehicle located around the vehicle, for example, a preceding vehicle 20. In the instant case, the communicator 140 may receive information about the preceding vehicle 20 through V2V communication with the preceding vehicle 20, for example, location, velocity, and acceleration information of the preceding vehicle 20. The communicator 140 may store the information of the preceding vehicle 20, received through the V2V communication with the preceding vehicle 20, in the storage 150.

The storage 150 may store data and/or an algorithm, and the like necessary for an operation of the driving state determining apparatus 100.

The storage 150 may store information of the preceding vehicle 20, obtained via the sensor 130 and/or the communicator 140 and may store information of a ego vehicle 10 of FIG. 1. For example, the storage 150 may store location, velocity, and acceleration information of the ego vehicle 10 and location, velocity, and acceleration information of the preceding vehicle 20.

Also, the storage 150 may store an algorithm used for the driving state determining state 100 to determine a prediction jerk in an interval between the preceding vehicle 20 and the ego vehicle 10 and determine a permission jerk of a driver of the ego vehicle 10. Also, the storage 150 may store condition information for determining a careless state of the driver and may store an instruction to control a vehicle in the careless state.

Herein, the storage 150 may include storage media including a random access memory (RAM), a static RAM (SRAM), a read-only memory (ROM), a programmable ROM (PROM), and an electrically erasable PROM (EEPROM).

The jerk calculator 160 may determine a minimum prediction jerk in an interval between the ego vehicle 10 and the preceding vehicle 20 using location, velocity, acceleration, and time information of the ego vehicle 10 and location, velocity, acceleration, and time information of the preceding vehicle 20.

Figure 3:
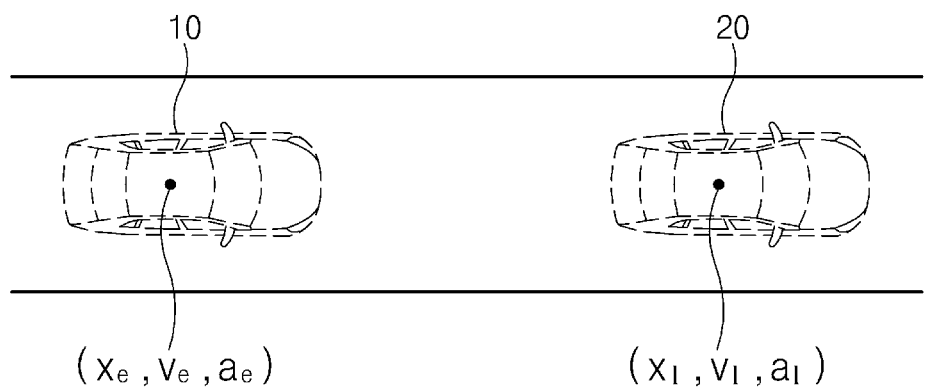
FIG. 3, FIG. 4A, and FIG. 4B are drawings illustrating an operation of determining a jerk at a driving state determining apparatus according to an exemplary embodiment of the present invention.

For example, as shown in FIG. 3, the jerk calculator 160 may determine a minimum prediction jerk in an interval between the ego vehicle 10 and the preceding vehicle 20 using a location $x_e$, a velocity $y_e$, and an acceleration $a_e$ of the ego vehicle 10 at a current time and a location $x_l$, a velocity $v_l$, and an acceleration $a_l$ of the preceding vehicle 20 at the same time as the current time.

Herein, the jerk may be a vector of specifying a time change rate of acceleration and may be represented as a third derivative about a displacement time. For example, the jerk may be represented as a value in which acceleration in a corresponding interval when the ego vehicle 10 departs at a start time and stops at an end time is differentiated. Herein, the end time may refer to a time when the ego vehicle 10 is stopped immediately before colliding with the preceding vehicle 20 when the ego vehicle 10 arrives at a location of the preceding vehicle 20.

In the instant case, a movement condition of the ego vehicle 10 for the minimum prediction jerk may be represented as Equation 1.

$$x(t) = \sum_{k=0}^{5} a_k t^k \qquad \text{[Equation 1]}$$

In Equation 1, x(t) may denote a location of the ego vehicle 10 at a time t, t may denote a time, and $a_k$ may denote any coefficient.

Assuming that a time in a current location of the ego vehicle 10, that is, a start time is "0" and that a time immediately before the ego vehicle 10 collides with the preceding vehicle 20, that is, an end time is "T", x(0) may represent a location of the ego vehicle 10 at the start time, that is, a current location (hereinafter referred to as "first location") and x(T) may represent a location (hereinafter referred to as "second location") of the ego vehicle 10 at the end time T. Herein, since x(0) is a location of the start time of the ego vehicle 10, it may be "0".

Further, a velocity (hereinafter referred to as "first velocity") of the ego vehicle 10 at the start time (t=0) may be represented as x'(0). An acceleration (hereinafter referred to as "first acceleration") of the ego vehicle 10 at the start point (t=0) may be represented as x"(0). A velocity (hereinafter referred to as "second velocity") of the ego vehicle 10 at the end time (t=T) may be represented as x'(T). An acceleration (hereinafter referred to as "second acceleration") of the ego vehicle 10 at the end time (t=T) may be represented as x"(T).

Herein, an exemplary embodiment of the present invention may determine a minimum jerk in a condition where a vehicle is stopped when arriving at an end time from a start time. Thus, since the vehicle is in a state where it is stopped at the end time, the second velocity x'(T) and the second acceleration x"(T) have a value of "0".

The jerk calculator 160 may derive "a0=x(0)" by applying "t=0" to x(t) of Equation 1. Also, the jerk calculator 160 may derive "a1=x'(0)" by applying "t=0" to x'(t) on which Equation 1 is differentiated. Also the jerk calculator 160 may derive "a2=x"(0)/2" by applying "t=0" to "x"(t)" in x'(t) is differentiated.

Meanwhile, the jerk calculator 160 may derive Equations 2 to 4 by applying "t=T" to x(t), x'(t), and x"(t) of Equation 1.

$$X(T)=a_0+a_1T+a_2T^2+a_3T^3+a_4T^4+a_5T^5 \qquad \text{[Equation 2]}$$

$$X'(T)=a_1+2a_2T+3a_3T^2+4a_4T^3+5a_5T^4=0 \qquad \text{[Equation 3]}$$

$$X''(T)=2a_2+6a_3T+12a_4T^2+20a_5T^3=0 \qquad \text{[Equation 4]}$$

Herein, when Equations 2 to 4 are disposed as determinants, the determinants may be represented as Equations 5 and 6 below. In the instant case, the jerk calculator 160 may derive $a_3$, $a_4$, and $a_5$ of Equation 1 above from Equation 6 below.

$$\begin{bmatrix} x(T)-a_0-a_1T-a_2T^2 \\ x'(T)-a_1-2a_2T \\ x''(T)-2a_2 \end{bmatrix} = \begin{bmatrix} T^3 & T^4 & T^5 \\ 3T^2 & 4T^3 & 5T^4 \\ 6T & 12T^2 & 20T^3 \end{bmatrix} \begin{bmatrix} a_3 \\ a_4 \\ a_5 \end{bmatrix} \qquad \text{[Equation 5]}$$

-continued $$\begin{bmatrix} a_3 \\ a_4 \\ a_5 \end{bmatrix} = \begin{bmatrix} T^3 & T^4 & T^5 \\ 3T^2 & 4T^3 & 5T^4 \\ 6T & 12T^2 & 20T^3 \end{bmatrix}^{-1} \begin{bmatrix} x(T) - a_0 - a_1 T - a_2 T^2 \\ x'(T) - a_1 - 2a_2 T \\ x''(T) - 2a_2 \end{bmatrix}$$ [Equation 6]

Meanwhile, when the ego vehicle 10 is stopped at a time immediately before it collides with the preceding vehicle 20, that is, at an end time, the preceding vehicle 20 may be in a driving state or a stop state.

If the preceding vehicle 20 is in the driving state at the end time, assuming that the preceding vehicle 20 maintains a movement state of a start time, a velocity $v_l$ and acceleration $a_l$ of the preceding vehicle 20 may be "$v_l + a_l T > 0$". In this case, if a location $x_l$, velocity $v_l$, and acceleration $a_l$ of the preceding vehicle 20, obtained at the start time, are applied to Equation 2, a second location of the ego vehicle 10 may be represented as Equation 7 below.

$$x(T) = x_l + v_l T + \frac{1}{2} a_l T^2$$ [Equation 7]

Meanwhile, if the preceding vehicle 20 is in the stop state at the end time, assuming that the preceding vehicle 20 maintains the movement state of the start time, the velocity $v_l$ and acceleration $a_l$ of the preceding vehicle 20 may be "$v_l + a_l T \leq 0$". In this case, if a location $x_l$, velocity $v_l$, and acceleration $a_l$ of the preceding vehicle 20, obtained at the start time, are applied to Equation 2, the second location of the ego vehicle 10 may be represented as Equation 8 below.

$$x(T) = x_l - \left( \frac{v_l^2}{2a_l} \right)$$ [Equation 8]

As described above, assuming that "$a_0 = x(0) = 0$", "$a_1 = x'(0)$", "$a_2 = x''(0)/2$", "$x'(T) = 0$", and "$x''(T) = 0$" in a determinant of Equation 6, that the first velocity $x'(0)$ is $v_e$, and that the first acceleration $x''(0)$ is $a_e$, the jerk calculator 160 may derive values of $a_3$, $a_4$, and $a_5$ of Equation 1 as Equations 9 to 11 below by applying the second location $x(T)$ of the ego vehicle 10, calculated from Equation 7, to the determinant of Equation 6.

$$a_3 = \frac{20 x_l + (-12 v_e + 20 v_l) T + (-3 a_e + 10 a_l) T^2}{2T^3}$$ [Equation 9]

$$a_4 = -\frac{30 x_l + (-16 v_e + 30 v_l) T + (-3 a_e + 15 a_l) T^2}{2T^4}$$ [Equation 10]

$$a_5 = \frac{12 x_l + (-6 v_e + 12 v_l) T + (-a_e + 6 a_l) T^2}{2T^5}$$ [Equation 11]

The jerk calculator 160 may calculate $x'''(t)$, in which $x(t)$ of Equation 1 is differentiated three times, as a jerk. Therefore, the jerk calculator 160 may derive a jerk calculation formula as Equation 12 below by applying values of $a_0$, $a_1$, $a_2$, $a_3$, $a_4$, and $a_5$ calculated above to Equation 1 and differentiating $x(t)$ of Equation 1 three times.

$$X'''(t) = 6a_3 + 24 a_4 t + 60 a_5 t^2$$ [Equation 12]

Herein, since the ego vehicle 10 is stopped at the end time, a jerk of the end time may be "0". Thus, the jerk calculator 160 may determine a time when $x'''(y)$ is 0 in Equation 12, that is, an end time T.

Assuming that the preceding vehicle 20 is in a driving state at the end time, when it is disposed that Equation 12 is T using Equation 7 indicating the second location $x(T)$ of the ego vehicle 10, an end time $T_{mov}$ when the ego vehicle 10 is stopped may be represented as Equations 13 and 14 below.

$$T_{mov} = \frac{4 v_e - 10 v_l + 2\sqrt{25 v_l^2 - 20 v_l v_e + 4 v_e^2 - 50 a_l x_l + 5 a_e x_l}}{10 a_l - a_e}$$ [Equation 13]

$$T_{mov} = \frac{4 v_e - 10 v_l - 2\sqrt{25 v_l^2 - 20 v_l v_e + 4 v_e^2 - 50 a_l x_l + 5 a_e x_l}}{10 a_l - a_e}$$ [Equation 14]

Meanwhile, assuming that the preceding vehicle 20 is in a stop state at the end time, when it is disposed that Equation 12 is T using Equation 8 indicating the second location $x(T)$ of the ego vehicle 10, an end time $T_{stop}$ when the ego vehicle 10 is stopped may be represented as Equations 15 and 16 below.

$$T_{stop} = \frac{-4 a_l v_e + \sqrt{16 a_l^2 v_e^2 + 20 a_e x_l a_l^2 - 10 a_e a_l v_l^2}}{a_l a_e}$$ [Equation 15]

$$T_{stop} = \frac{-4 a_l v_e - \sqrt{16 a_l^2 v_e^2 + 20 a_e x_l a_l^2 - 10 a_e a_l v_l^2}}{a_l a_e}$$ [Equation 16]

Herein, the jerk calculator 160 may determine $T_{mov}$, which is shorter than a stop time $-(v_l/a_l)$ of the preceding vehicle 20 between $T_{mov}$ of Equation 13 and $T_{mov}$ of Equation 14, as an end time T. If both of $T_{mov}$ of Equation 13 and $T_{mov}$ of Equation 14 are longer than the stop time $-(v_l/a_l)$ of the preceding vehicle 20, the jerk calculator 160 may determine $T_{stop}$, which has a positive number and is shorter between $T_{stop}$ of Equation 15 and $T_{stop}$ of Equation 16, as the end time T.

If the end time T is determined through the above-mentioned process, the jerk calculator 160 may calculate the sum of squares of a jerk $x'''(t)$ in an interval between the start time and the determined end time T as a minimum prediction jerk.

Meanwhile, the jerk calculator 160 may determine a permission jerk of the driver. Since the permission jerk of the driver differs for each driver, the jerk calculator 160 may determine a permission jerk for each driver.

In the instant case, the jerk calculator 160 may determine a permission jerk of the driver using an increasing velocity distribution of master cylinder pressure (MCP) when a prediction jerk is "0" and if the driver puts on a brake of the ego vehicle 10. For example, the increasing velocity distribution of the MCP when the driver puts on the brake of the ego vehicle 10 in a state where the prediction jerk is 0 may be represented as FIG. 4A.

Figure 4A:
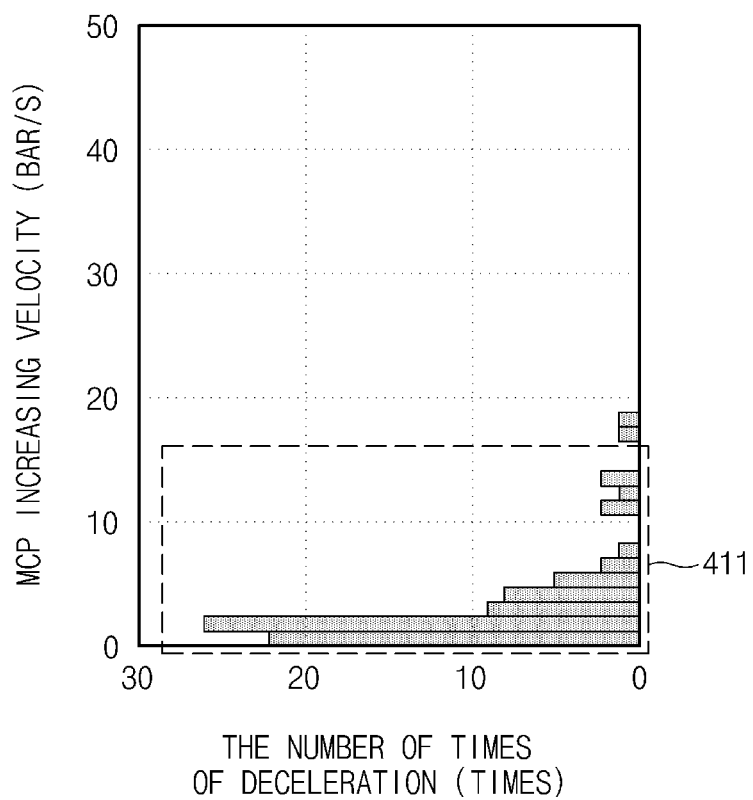

As shown in reference numeral 411 of FIG. 4A, it may be known that the driver does not feel threatened in an interval where the increasing velocity distribution of the MCP is 0 to 15 [bar/s].

Figure 4B:
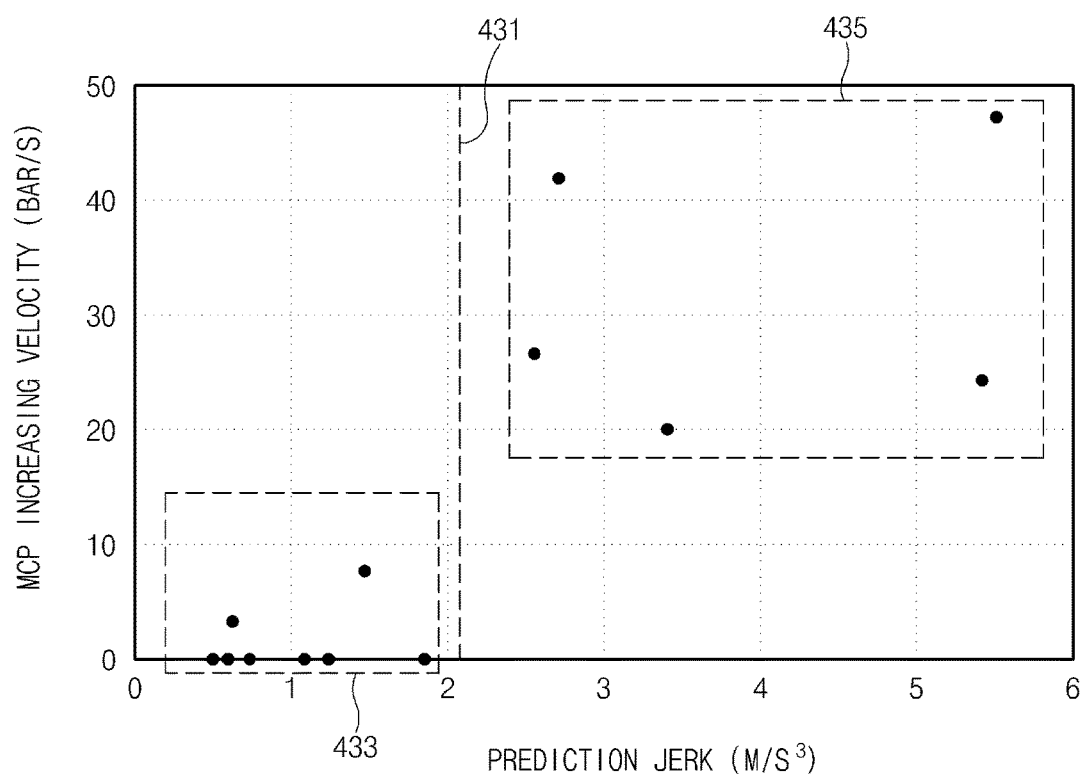

FIG. 4B illustrates a prediction jerk according to an increasing velocity of MCP. Reference numeral 431 in FIG. 4B indicates a permission jerk of the driver. For example, 2.2 [m/s$^3$] may be a permission jerk of the corresponding driver. Herein, when a value of the jerk is larger, threat the driver feels may be more increased.

As shown in reference numeral 433 of FIG. 4B, when a minimum prediction jerk between the start time and the end time determined above is less than or equal to the permission jerk of the driver, there may be a state where the driver does not feel threatened. As shown in reference numeral 435 of FIG. 4B, when the minimum prediction jerk is greater than the permission jerk of the driver, there may be a state where the driver feels threatened.

Thus, the determiner 170 may determine whether the minimum prediction jerk between the start time and the end time is greater than the permission jerk of the driver. When the minimum prediction jerk between the start time and the end time is greater than the permission jerk of the driver, the determiner 170 may determine a driving operation state by the driver.

When the minimum prediction jerk between the start time and the end time is greater than the permission jerk of the driver and when the determiner 170 does not detect a separate driving operation by the driver, it may determine a current driving state as a careless driving state.

For example, when an accelerator pedal is pressed to be greater than 20% in a state where the minimum prediction jerk is greater than the permission jerk of the driver, when velocity at which the accelerator pedal is pressed is greater than 100%/second, when MCP is greater than 5 [bar/s], when an absolute value of a steering angle is kept 5 degrees or more, or when a steering angle speed is kept 20 degrees per second, the determiner 170 may determine the current driving state as the careless driving state.

Thus, when the current driving state is determined as the careless driving state by the determiner 170, the signal processor 180 may output an alert via a display, a speaker, a light emitting diode (LED), a buzzer, or the like of the interface 120.

Also, after outputting the alert, the signal processor 180 may transmit an instruction to a driving device of the ego vehicle 10 to perform collision avoiding control. Alternatively, the signal processor 180 may transmit a message of providing notification of a careless driving state to a collision control system connected via the communicator 140.

A description will be given in detail of an operation of the driving state determining apparatus 100 according to an exemplary embodiment of the present invention.

Figure 5:
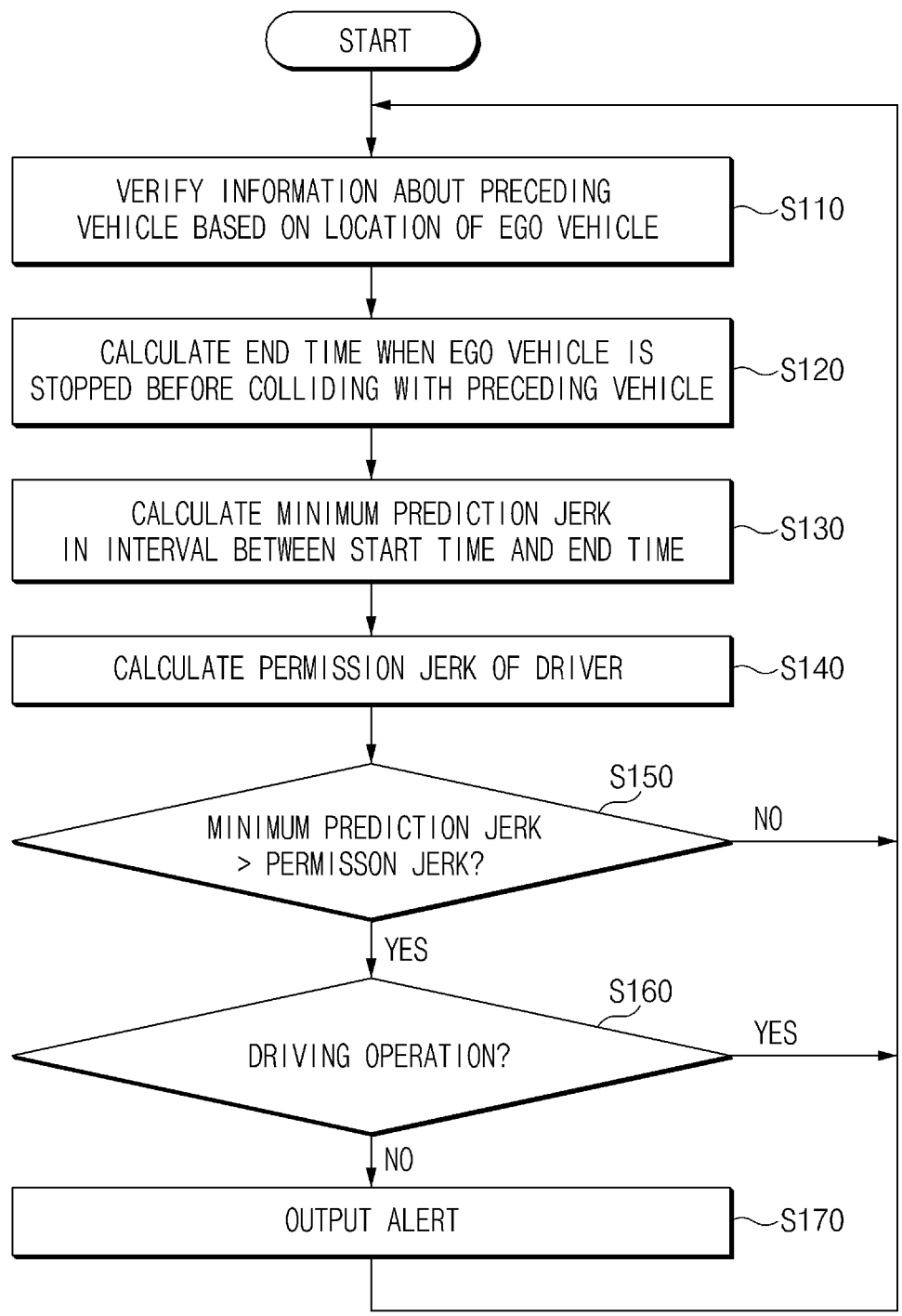
FIG. 5 and FIG. 6 are drawings illustrating an operation of a driving state determining method according to an exemplary embodiment of the present invention.

FIG. 5 is a drawing illustrating an operation of a driving state determining method according to an exemplary embodiment of the present invention.

Referring to FIG. 5, in operation S110, a driving state determining apparatus 100 may verify information of a preceding vehicle 20 of FIG. 3, for example, location, velocity, and acceleration information based on a location of a ego vehicle 10 of FIG. 3 relative to a current time. In operation S110, the driving state determining apparatus 100 may obtain the information of the preceding vehicle 20 using a distance sensor or may receive the information of the preceding vehicle 20 through V2V communication with the preceding vehicle 20.

In operation S120, the driving state determining apparatus 100 may determine an end time when the ego vehicle 10 is stopped before colliding with the preceding vehicle 20 relative to a location of the preceding vehicle 20, using a location, velocity, and acceleration of the ego vehicle 10 at the current time and a location, velocity, and acceleration of the preceding vehicle 20 at the same time as the current time. When the current time is a start time, in operation S130, the driving state determining apparatus 100 may determine a minimum prediction jerk of the ego vehicle 10 in an interval between the start time and the end time determined in operation S120.

An exemplary embodiment of determining the end time and the minimum prediction jerk of the ego vehicle 10 may refer to Equations 1 to 16.

In operation S140, the driving state determining apparatus 100 may determine a permission jerk of a driver of the ego vehicle 10. In operation S140, the permission jerk of the driver may be determined using an increasing velocity distribution of MCP when a prediction jerk is "0" and if the driver puts on a brake of the ego vehicle 10.

In operation S150, the driving state determining apparatus 100 may compare the minimum prediction jerk determined in operation S130 with the permission jerk of the driver, determined in operation S140. When the minimum prediction jerk is greater than the permission jerk in operation S150, in operation S160, the driving state determining apparatus 100 may determine whether there is a separate driving operation by the driver.

When the minimum prediction jerk is greater than the permission jerk and when there is no separate driving operation from the driver in operation S160, in operation S170, the driving state determining apparatus 100 may determine that a current driving state is a careless driving state and may output an alert.

Meanwhile, when the minimum prediction jerk is less than the permission jerk of the driver or when it is determined there is the separate driving operation by the driver in operation S160, the driving state determining apparatus 100 may determine that the current driving state is not the careless driving state and may perform the operation from operation S110.

Figure 6:
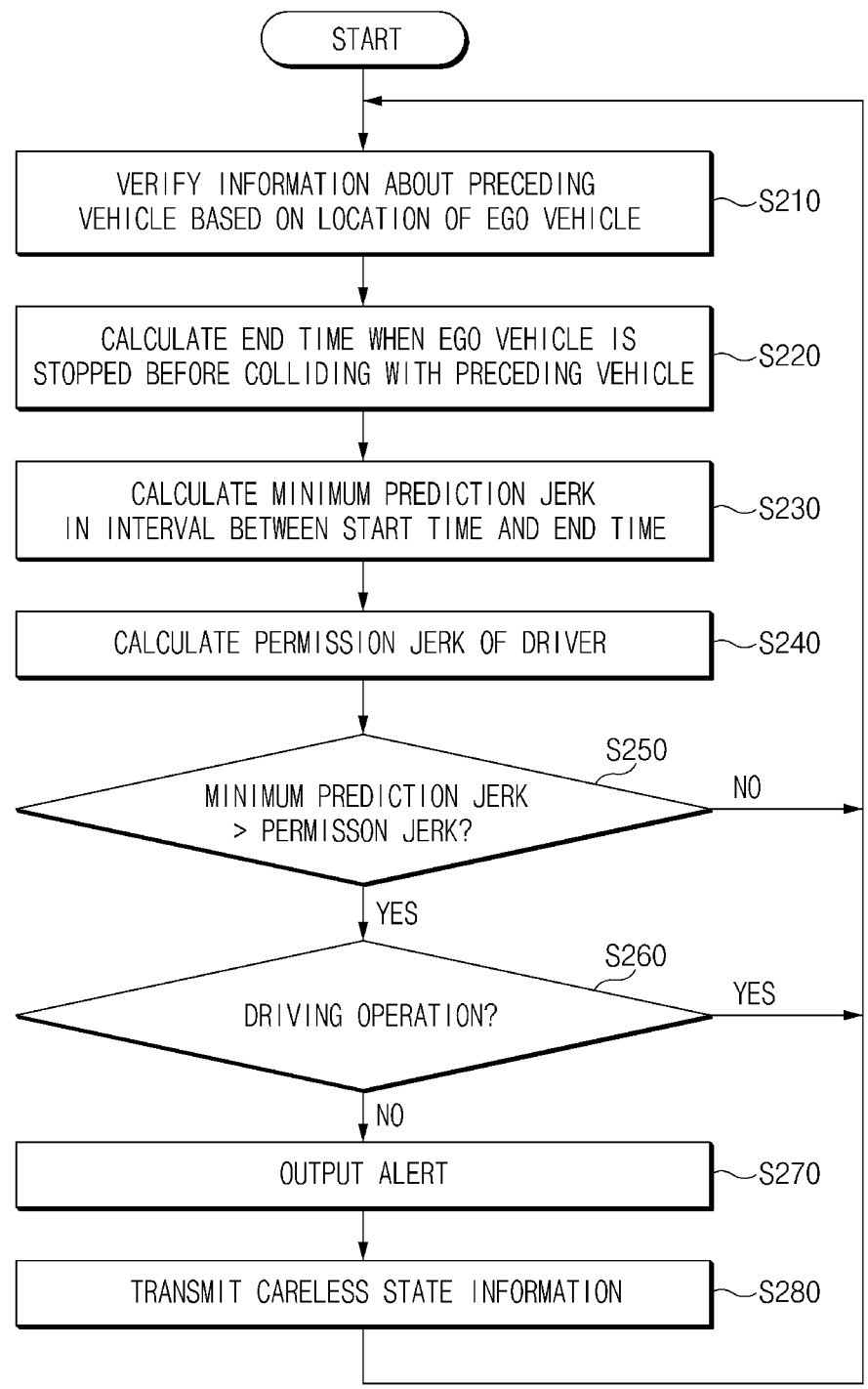

Meanwhile, as shown in FIG. 6, after outputting an alert in operation S270, in operation S280, the driving state determining apparatus 100 may transmit a careless driving state information message to a collision control system of a vehicle.

Since operations S210 to S270 shown in FIG. 6 are the same as operations S110 to S170 shown in FIG. 5, an overlapped description for operations S210 to S270 will be omitted.

The driving state determining apparatus 100 according to an exemplary embodiment may be implemented in a form of an independent hardware device and may be driven in a form of being included in another hardware device including a micro-processor or a general purpose computer system as at least one or more processors.

Figure 7:
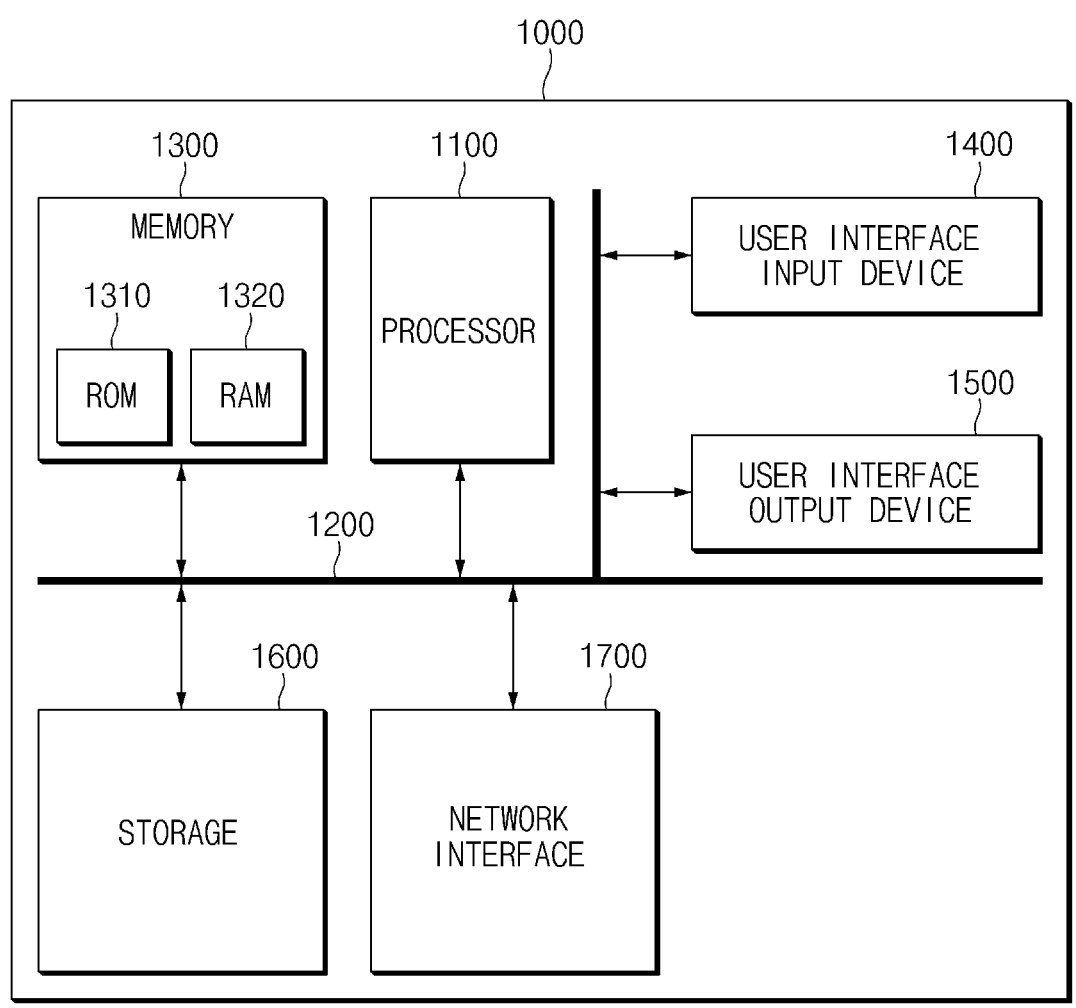
FIG. 7 is a block diagram illustrating a configuration of a computing system in which a driving state determining method is executed, according to an exemplary embodiment of the present invention.

FIG. 7 is a block diagram illustrating a configuration of a computing system in which a driving state determining method is executed, according to an exemplary embodiment of the present invention.

Referring to FIG. 7, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processor (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments included in the specification may be directly implemented with a hardware module, a software module, or combinations thereof, executed by the processor 1100. The software module may reside on a storage medium (e.g., the memory 1300 and/or the storage 1600) including a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside in a user terminal. Alternatively, the processor and the storage medium may reside as a separate component of the user terminal.

According to various embodiments, the driving state determining apparatus may determine a careless driving state based on whether there is a driving operation when a minimum prediction jerk predicted in a specific interval is greater than a permission jerk of a driver, without a separate sensor which detects a state of the driver. The driving state determining apparatus may control collision by reflecting a jerk a driver feels.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for determining a driving state, the apparatus comprising:
   a jerk calculator configured to determine a minimum prediction jerk generated in an interval until an ego vehicle arrives at a location of a preceding vehicle, using location, velocity, and acceleration information of the ego vehicle at a current time and location, velocity, and acceleration information of the preceding vehicle and determine a permission jerk of a driver of the ego vehicle;
   a determiner configured to determine whether the minimum prediction jerk determined in the interval is greater than the permission jerk of the driver and determine a careless driving state based on a driving operation state of the driver when the minimum prediction jerk is greater than the permission jerk of the driver; and
   a signal processor configured to output an alert when it is determined as the careless driving state by the determiner.

2. The apparatus of claim 1, wherein the jerk calculator is configured to:
   define the current time as a start time;
   define a time when the ego vehicle is configured to be stopped before colliding with the preceding vehicle as an end time; and
   determine a prediction jerk at each of the start time and the end time in an interval between the start time and the end time.

3. The apparatus of claim 2, wherein the jerk calculator is configured to:
   determine the prediction jerk by differentiating a location of the ego vehicle at each of the start time and the end time three times in the interval between the start time and the end time.

4. The apparatus of claim 3, wherein the jerk calculator is configured to:
   define the location of the ego vehicle at each of the start time and the end time in the interval between the start time and the end time using an Equation below, $$x(t) = \sum_{k=0}^{5} a_k t^k \quad \text{[Equation]}$$

where x(t) denotes a location of the ego vehicle at a time t and $a_k$ denotes a coefficient.

5. The apparatus of claim 4, wherein the jerk calculator is configured to:
   define a first location, a first velocity, and a first acceleration of the ego vehicle at the start time and a second location, a second velocity, and a second acceleration of the ego vehicle at the end time using the Equation above.

6. The apparatus of claim 5, wherein the first location, the second velocity, and the second acceleration of the ego vehicle have a value of "0".

7. The apparatus of claim 6, wherein the jerk calculator is configured to:
   determine each coefficient of the Equation above using the first location, the first velocity, and the first acceleration of the ego vehicle at the start time and the second location, the second velocity, and the second acceleration of the ego vehicle at the end time.

8. The apparatus of claim 7, wherein the jerk calculator is configured to:
   determine the second location, the second velocity, and the second acceleration of the ego vehicle at the end time using a location, velocity, and acceleration based on a driving state of the preceding vehicle at the start time.

9. The apparatus of claim 8, wherein the jerk calculator is configured to:
   determine an end time when the prediction jerk is "0", using an Equation below when the preceding vehicle is a driving state at the end time, $$x(T) = x_l v_l T + \tfrac{1}{2} a_l T^2 \quad \text{[Equation]}$$

where T denotes an end point, x(T) denotes a location of the ego vehicle at the end time, $x_l$ denotes a location of the preceding vehicle at the start time, $v_l$ denotes a velocity of the preceding vehicle at the start time, and $a_l$ denotes an acceleration of the preceding vehicle at the start time.

10. The apparatus of claim 8, wherein the jerk calculator is configured to:
   determine an end time when the prediction jerk is "0", using an Equation below when the preceding vehicle is a stop state at the end time, $$x(T) = x_l - \left(\frac{v_l^2}{2a_l}\right) \quad \text{[Equation]}$$

where T denotes an end point, x(T) denotes a location of the ego vehicle at the end time, $x_l$ denotes a location of the preceding vehicle at the start time, $v_l$ denotes a velocity of the preceding vehicle at the start time, and $a_l$ denotes an acceleration of the preceding vehicle at the start time.

11. The apparatus of claim 2, wherein the jerk calculator is configured to:
   determine a sum of squares of the prediction jerk at each of the start time and the end time in the interval between the start time and the end time as the minimum prediction jerk.

12. The apparatus of claim 2, wherein the determiner is configured to:
   when the minimum prediction jerk in the interval between the start time and the end time is greater than the permission jerk of the driver, determine the careless driving state here is no separate driving operation by the driver.

13. The apparatus of claim 1, wherein the jerk calculator is configured to:
   determine the permission jerk of the driver using an increasing velocity distribution of master cylinder pressure (MCP) when a brake of the ego vehicle is configured to be operated in a state where a jerk is "0".

14. The apparatus of claim 1, further including:
   a sensor configured to obtain the location, velocity, and acceleration information of the ego vehicle and the location, velocity, and acceleration information of the preceding vehicle.

15. The apparatus of claim 1, further including:
   a communicator configured to receive the location, velocity, and acceleration information of the preceding vehicle through vehicle-to-vehicle (V2V) communication with the preceding vehicle.

16. An apparatus for determining a driving state, the apparatus comprising:
   a jerk calculator configured to determine a minimum prediction jerk generated in an interval until an ego vehicle arrives at a location of a preceding vehicle, using location, velocity, and acceleration information of the ego vehicle at a current time and location, velocity, and acceleration information of the preceding vehicle and determine a permission jerk of a driver of the ego vehicle;
   a determiner configured to determine whether the minimum prediction jerk determined in the interval is greater than the permission jerk of the driver and determine a careless driving state based on a driving operation state of the driver when the minimum prediction jerk is greater than the permission jerk of the driver; and
   a signal processor configured to output an alert when it is determined as the careless driving state and transmit a message including information about the careless driving state to a collision control system in the ego vehicle.

17. A method for determining a driving state, the method comprising:
   obtaining location, velocity, and acceleration information of an ego vehicle at a current time and location, velocity, and acceleration information of a preceding vehicle;
   determining a minimum prediction jerk generated in an interval until the ego vehicle arrives at a location of the preceding vehicle, using the location, velocity, and acceleration information of the ego vehicle at the current time and the location, velocity, and acceleration information of the preceding vehicle and determining a permission jerk of a driver of the ego vehicle;
   determining whether the minimum prediction jerk determined in the interval is greater than the permission jerk of the driver and determine a careless driving state based on a driving operation state of the driver when the minimum prediction jerk is greater than the permission jerk of the driver; and
   outputting an alert, when it is configured to be determined the careless driving state.

18. The method of claim 17, wherein the determining of the minimum prediction jerk includes:
   defining the current time as a start time;
   defining a time when the ego vehicle is configured to be stopped before colliding with the preceding vehicle as an end time; and
   determining a prediction jerk at each of the start time and the end time in an interval between the start time and the end time.

19. The method of claim 18, wherein the determining of the minimum prediction jerk includes:
   determining the prediction jerk by differentiating a location of the ego vehicle at each of the start time and the end time three times in the interval between the start time and the end time.

20. The method of claim 18, wherein the determining of the minimum prediction jerk includes:
   determining a sum of squares of the prediction jerk at each of the start time and the end time in the interval between the start time and the end time as the minimum prediction jerk.

* * * * *